United States Patent [19]
Williams

[11] Patent Number: 6,026,123
[45] Date of Patent: Feb. 15, 2000

[54] DIGITAL TRANSMISSION SYSTEM WITH HIGH IMMUNITY TO DYNAMIC LINEAR DISTORTION

[76] Inventor: Thomas H. Williams, 6423 Fairways Dr., Longmont, Colo. 80503-8321

[21] Appl. No.: 08/910,507

[22] Filed: Aug. 2, 1997

[51] Int. Cl.[7] .......................... H04B 15/00; H04L 25/49; H03D 1/04
[52] U.S. Cl. .......................... 375/285; 375/296; 375/346
[58] Field of Search ..................... 375/285, 296, 375/346, 347, 267; 455/501, 63; 704/226, 227, 228; 370/203, 210

[56] References Cited

U.S. PATENT DOCUMENTS

| | | | |
|---|---|---|---|
| 3,864,632 | 2/1975 | Chang | 375/230 |
| 4,041,239 | 8/1977 | Haass | 375/296 |
| 4,593,161 | 6/1986 | Desblache et al. | 179/170.2 |
| 4,623,980 | 11/1986 | Vary | 364/724 |
| 5,117,418 | 5/1992 | Chaffee et al. | 370/32.1 |
| 5,265,127 | 11/1993 | Betts et al. | 375/296 |
| 5,317,596 | 5/1994 | Ho et al. | 375/232 |
| 5,425,050 | 6/1995 | Schreiber et al. | 375/200 |
| 5,504,775 | 4/1996 | Chouly et al. | 375/205 |
| 5,577,116 | 11/1996 | Townsend et al. | 379/410 |
| 5,598,436 | 1/1997 | Brajal et al. | 375/285 |
| 5,598,468 | 1/1997 | Ammicht et al. | 379/410 |
| 5,610,908 | 3/1997 | Shelswell et al. | 370/210 |
| 5,651,028 | 7/1997 | Harris et al. | 375/296 |

*Primary Examiner*—Tesfaldet Bocure
*Attorney, Agent, or Firm*—Lacasse & Associates; Randy W. Lacasse

[57] ABSTRACT

A digital transmission system that provides high immunity to rapidly changing multipath distortion by sending a normal data block followed by a reciprocal data block with the same random data in an inverted form. The second block of data is comprised of frequency components whose coefficients are the reciprocal of the frequency coefficients found in the equivalent terms in the first block. At the receive site, both blocks are received and transformed into the frequency domain The frequency coefficients of the second block are divided by the corresponding frequency coefficient in the first block using complex arithmetic. The square root is taken on the product, yielding a de-ghosted normal block. If any of the frequency coefficients of the first block of data are zero, creating the reciprocal will involve division by zero. This problem Is remedied by using a modulation system such as orthogonal frequency division multiplexing (OFDM) that can maintain control over coefficient values at all frequencies. A guard interval may be used with the data blocks. Forward error correction may be applied to the data to improve bit error rate performance with large echoes.

19 Claims, 12 Drawing Sheets

```
// normal block/reciprocal block modulation by t.williams July 4, 1997
#include <math.h>
#include <stdio.h>
#include <stdlib.h>
#include <io.h>
include <conio.h> typedef struct {
    float real, imag;
} COMPLEX;

void fft(COMPLEX *,int);   // fast Fourier transform
void ifft(COMPLEX *,int);  // inverse fast Fourier transform
float Nreal[1152], Nimag[1152];  // N data block
float Rreal[1152],Rimag[1152] ;  // R data block
float mag1[1024],ang1[1024],mag2[1024],ang2[1024];

int main()
{
   int y[2100], i, m=10, re[1024],im[1024];
   COMPLEX *x;
   x=(COMPLEX*) calloc((int)pow(2,m), sizeof(COMPLEX));
   if(!x){printf("\n Unable to allocate input memory.\n");exit(1);};

for( i=0; i<2048; i++) y[i]=0;     //reset to 0

// generate 2048 pseduo random bits
   y[0]=0; y[1]=0;y[5]=0;y[6]=0;y[7]=1;  // initialize
   for( i=0; i<2048; i++)
      y[i+12] = y[i+11]^( y[i+10]^( y[i+9]^y[i+1] ) );

// generate 1024 random QPSK constellation points
   for( i=0; i<1024; i++)
   {
        if( y[i]==0 && y[i+1024]==0) { re[i]=-1;im[i]=-1;}
        if( y[i]==0 && y[i+1024]==1) { re[i]=-1;im[i]=1;}
        if( y[i]==1 && y[i+1024]==0 ){ re[i]=1;im[i]=-1;}
        if( y[i]==1 && y[i+1024]==1 ){ re[i]=1;im[i]=1;}
   } for( i=0; i<25; i++)
      printf("%d %d %d\n", i, re[i], im[i]);   //print result getch();   // Pause to show the results for( i=0; i<1024; i++) //get ready for IFFT
   {
      x[i].real=re[i];
      x[i].imag=im[i];
   }

// perform inverse fast Fourier transform to make N data block
   // place a guard interval on N block and store N block as Nreal and Nimag
   ifft( x, m);

for( i=128; i<128+1024; i++)
   {
      Nreal[i]=x[i-128].real;
      Nimag[i]=x[i-128].imag;
   } for(i=0; i<128; I++)
   {
      Nreal[i]=x[896+i].real;
      Nimag[i]=x[896+i].imag;
```

Fig 11

```
} for( i=0; i<1024; i++ )  //fabricate a reciprocal block from same data
{
      if( re[i]==-1 && im[i]==-1 ){ x[i].real=-1;x[i].imag=1; }
      if( re[i]== 1 && im[i]== 1 ){ x[i].real=1;x[i].imag=-1; }
      if( re[i]==-1 && im[i]== 1 ){ x[i].real=-1;x[i].imag=-1; }
      if( re[i]== 1 && im[i]==-1 ){ x[i].real=1;x[i].imag=1; }
} ifft( x,m );

// place a guard interval on R block and store R block as Rreal and Rimag
for( i=128; i<128+1024; i++)
{
   Rreal[i]=x[i-128].real;
   Rimag[i]=x[i-128].imag;
} for( i=0; i<128; i++)
{
   Rreal[i]=x[896+i].real;
   Rimag[i]=x[896+i].imag;
}

// done making a N block and a R block--add optional echoes here to N and R
//receiving N block and preparing it for a FFT
for( i=128; i<1152; i++)
{
    x[i-128].real=Nreal[i];
    x[i-128].imag=Nimag[i];
}

// convert N block from time domain into frequency domain
// change the N block into magnitude and a phase for 1024 frequencies
fft( x, m );

for( i=0; i<1024; i++)
{
    mag1[i]=sqrt( pow( x[i].real, 2 ) + pow( x[i].imag, 2 ) );
    ang1[i]=atan2( x[i].imag, x[i].real );
}

//receiving R block and preparing it for a FFT
for( i=128; i<1152; i++)
{
    x[i-128].real=Rreal[i];
    x[i-128].imag=Rimag[i];
}

// convert R block from time domain into frequency domain
// convert the N block into magnitude and phase for 1024 frequencies
fft( x, m );

for( i=0; i<1024; i++)
{
    mag2[i]=sqrt( pow( x[i].real, 2 ) + pow( x[i].imag, 2 ) );
    ang2[i]=atan2( x[i].imag, x[i].real );
    mag1[i]=sqrt( mag1[i] ) / sqrt( mag2[i] );    // remove echo
    ang1[i]=ang1[i]/2 - ang2[i] / 2;              // remove echo
} for( i=0; i<25; i++ )//print result
    printf("%d %f %f\n", i, mag1[i], ang1[i]);
return(0); } // Program is complete
```

Fig 11 (cont.)

DIGITAL TRANSMISSION SYSTEM WITH HIGH IMMUNITY TO DYNAMIC LINEAR DISTORTION

BACKGROUND

1. Field of the Invention

This patent relates generally to transmission systems. More specifically, the present invention relates to data transmission over signal paths with rapidly changing linear distortion, which is frequently found in radiated signals, and a method to correct therefore.

2. Description of Prior Art

One of the severe distortions that affect digital transmissions is multipath. Multipath is a linear distortion that is also known as echoes or ghosts. Multipath can be created by signals reflecting from buildings and impedance discontinuities in cables. With multipath, one or more copies of the original signal are added to the original signal, typically with delay and attenuation. On broadcast analog television pictures received via radiated transmissions, multipath appears as additional fainter images that are typically delayed relative to the image received via a direct path. On a digital transmission, severe multipath renders the data useless. Mild multipath increases the bit error rate (BER) in the presence of random noise or other additive impairments.

Other linear distortions also affect digital transmissions. Some of these distortions are non-flat frequency response and group delay. These distortions can occur because of imperfect filters and amplifier tut.

One prior art solution to correct for multipath is to employ a device called an adaptive equalizer. Adaptive equalizers are very well known in the art and are widely used. These devices work by summing a delayed version of the distorted received signal with the distorted received signal to cancel the echoes in a process called de-ghosting. The tap coefficients in the adaptive equalizer must be programmed to cancel the echoes. Programming can be assisted by using a special signal called a training, or reference, signal. The coefficients for the adaptive equalizer are computed by using the received reference signal and a stored version of the ideal reference signal. As intermediate steps, the frequency and impulse response of the channel are determined. The tap coefficients are computed as the reciprocal of the impulse response. The adaptive equalizer can also be programmed by using blind equalization techniques.

The problem with prior art adaptive equalizer methods of echo cancellation (or de-ghosting) is that the programming time is slow, so rapidly changing multipath can not be accurately corrected. To remedy this problem, much work has been done on fast algorithms. Typically increases in speed are accompanied by decreases in coefficient accuracy. *Adaptive Filter Theory* by Simon Haykin (published by Prentice Hall, 3rd edition) explains the theory of adaptive equalizers.

Echoes may change for many reasons. If the transmit tower is swaying the echoes may not be stationary. Likewise, if the transmitter location is moving relative to the receiver location, the echoes will vary. Moving reflective objects, such as vehicular traffic or pedestrian traffic, also vary the reflective nature of the transmission path. Microwave transmissions over water may be disturbed by dynamic reflections off of water waves. As wavelengths become shorter and motion is faster, the convergence rate of the adaptive equalizer needs to be faster.

Other signal transmission methods, such as code division multiple access (CDMA) and frequency modulation (FM) are used because they are resistant to multipath. Some of these systems are less than optimal for other reasons such as hardware complexity or bandwidth efficiency.

Transmission of digital information is commonly done with blocks of data. It is a common practice to use a linear code for purposes of forward error correction (FEC), such as a Reed-Solomon code, whereby some percentage of erred symbols can be corrected by the code. *Digital Communications Fundamentals* and Applications by Bernard Sklar (published by Prentice Hall) explains the basics of practical digital communications including linear codes.

OFDM (orthogonal frequency division multiplexing) signals are sent in blocks and are comprised of many harmonics that are orthogonal to each other by virtue of their integer relationship to a fundamental frequency. By varying the phase and the magnitude of the harmonics, information can be transmitted while preserving the orthogonality between each of the harmonics. Echoes also affect OFDM signals. The effect of the echo can be corrected by using a guard interval in the time domain, provided the delay of the echo is shorter than the duration of the guard interval. Each received frequency coefficient may then be corrected by a single complex multiplication that corrects the magnitude and phase. The use of a training, or pilot, signal assists in the determination of the correct complex multiplication coefficient to use on each coefficient.

The European community plans to use OFDM modulation for terrestrial broadcast of advanced television signals. In the United States OFDM is being used to carry data over the hostile environment of cable television upstream plant. "Using Orthogonal Frequency Division Multiplexing in the Vertical Interval of an NTSC TV Transmission" by M. Chelehemal and T. Williams (published in 1995 Proceedings of the NAB) is one of many papers explaining OFDM. OFDM may be used at baseband, or it may be transported by an RF (radio frequency) or microwave carrier. It can be modulated onto the carrier using a QAM (quadrature amplitude modulation) system or a VSB (vestigial sideband) system.

Another method to solve the rapidly changing multipath problem is to embed a training signal in the burst or packet transmission. The GSM cellular phone system, which is widely employed in Europe, uses this method. Embedding a training signal in each voice packet transmitted reduces the amount of data that can be sent.

Characterizing channels using frequency domain techniques is known in the art Likewise, using OFDM signals with fixed data as reference signals is also known in the art since OFDM signals that have constant spectral energy make good reference signals.

OBJECT OF THE INVENTION

It is an object of this invention to provide a transmission system that can provide reliable bandwidth-efficient data transmission in the presence of rapidly changing linear distortion, of which dynamic multipath is an example. It is also an object of this invention to deghost data transmissions without the intermediate step of determining the frequency or impulse response of the channel. It is also an object of this invention to make reference training signals carry data. It is also an object of this invention to use transmissions of random data as reference signals.

DRAWING FIGURES

FIG. 11 is a C language program illustrating the transmission system.

SUMMARY OF THE INVENTION

A system for receiving signals without linear distortion comprising a transmitter, a receiver, a signal path, data block, and a reciprocal data block wherein the frequency coefficients in the received reciprocal data block are divided by the frequency coefficients in the normal data block, wherein the square root is taken on the quotients, whereby linear distortion is removed from the normal data block.

Description—FIGS. 1 to 4

Figure 1:
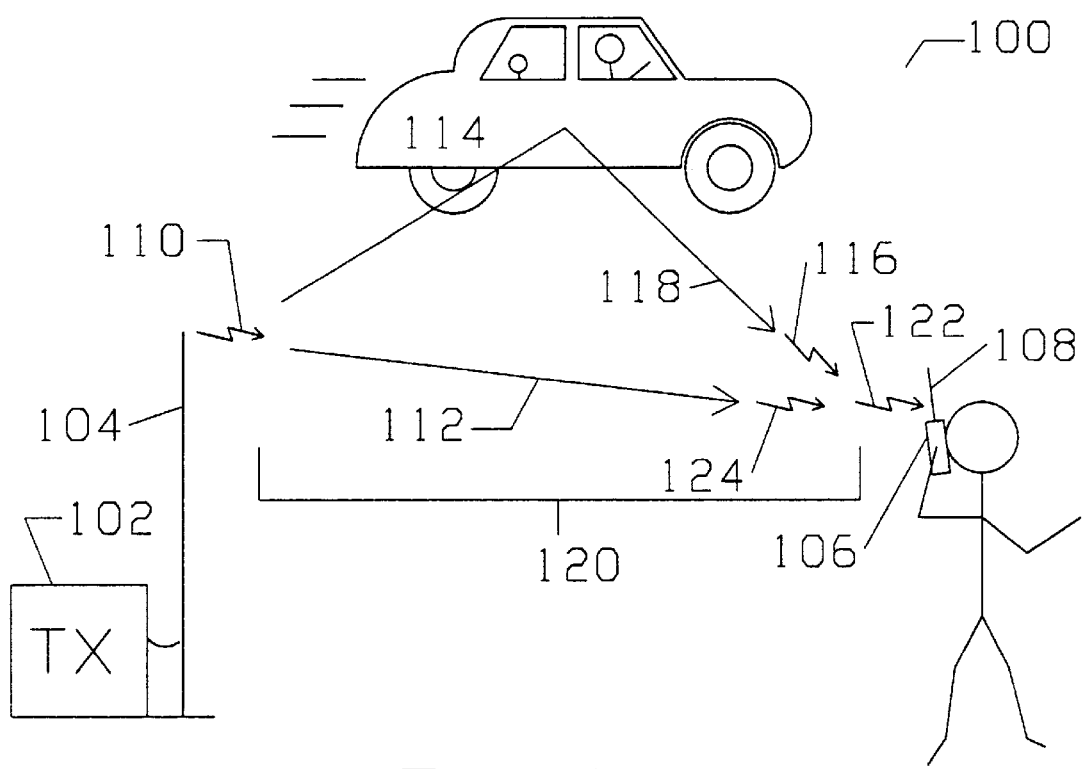
FIG. 1 is a signal path block diagram illustrating a signal path that is contaminated with multipath

FIG. 1 is a signal path block diagram 100 illustrating a transmitter 102 with a transmitting antenna 104 and a receiver 106 with a receiving antenna 108. A baseband signal is modulated onto a carrier forming an RF signal 110 and sent over a signal path 120 between the transmitter 102 and the receiver 106. The transmitted data may be of any form including but not limited to telephony, computer code, file data, network data, internet, WWW (world wide web), entertainment video, video phone, . . . . The data may be broadcast or intended for only the single receiver 106. The signal path 120 is comprised of a direct signal path 112 and an echo signal path 118. The presence of echoes from reflections such as a reflecting object 114 will cause a received signal 122 to be distorted by the presence of an echo signal 116 combined with a direct path signal 124. In some cases the signal path 112 may be obstructed and the only signal reception possible will be from the echo signal 116 from the echo signal path 118.

Assume that data sent between the transmitter 102 and the receiver 106 is sent in a data block or a packet, which is common practice. For the sake of brevity, the letter "N" will represent the word "normal", and the letter "R" will represent the word "reciprocal". N implies that the transmitted data block is not inverted, and R implies that the data block is inverted by taking a reciprocal of each frequency coefficient. If the data block size is 1024 complex points, 1024 complex divisions into 1.0 (a real number) must be done to find a reciprocal data block.

If $s_N(t)$ is a normal (N) data block with a time domain representation, it can also be represented as a frequency domain N data block $S_N(f)$. The conversion between the time and the frequency domains can be done with a fast Fourier transform (FFT) and an inverse fast Fourier transform (IFFT). If $S_N(f)$ is received through the signal path 120 with a complex frequency response H(f), then a received N data block $X_N(f)$ will be:

$$X_N(f) = S_N(f) \cdot H(f) \qquad (1)$$

which is distorted with echoes.

A reciprocal (R) data block $S_R(f)$ is created from $S_N(f)$ by inverting each frequency coefficient of $S_N(f)$ using complex division:

$$S_R(f) = \frac{1}{S_N(f)} \qquad (2)$$

If the reciprocal (R) data block is also received through the signal path 120, a received R data block $X_R(f)$ will be:

$$X_R(f) = S_R(f) \cdot H(f) = \frac{1}{S_N(f)} \cdot H(f) \qquad (3)$$

$X_R(f)$ will also be distorted by a multiplication with the same complex frequency response H(f).

If the received N data block $X_N(f)$ and the received R data block $X_R(f)$ are captured and processed with each other, de-ghosting can be accomplished.

If $X_R(f)$ is inverted and multiplied by $X_N(f)$. The result will be:

$$X_N(f) \cdot \frac{1}{X_R(f)} = [S_N(f) \cdot H(f)] \cdot \left[ \frac{1}{\frac{1}{S_N(f)} \cdot H(f)} \right] \qquad (4)$$

$$= [S_N(f) \cdot H(f)] \cdot \left[ S_N(f) \cdot \frac{1}{H(f)} \right] = S_N^2(f) \qquad (5)$$

The original undistorted N data block can be found from:

$$S_N(f) = \sqrt{S_N^2(f)} \qquad (6)$$

Another way to receive an undistorted N data block is to transmit a square root N data block and a square root R data block. In essence the square root N data block is created by taking the square root of each coefficient in the N data block. Likewise, the square root R data block is created by taking the reciprocal of each coefficient in the square root N data block. After reception of the square root N data block and square root R data block, the square root R data block is divided into the square root N data block. The square root is not taken on the quotient. Recognizing that multiplication by the reciprocal is the same as division, the equation for the product of a received square root N data block times the reciprocal of a received square root R data block is:

$$X_N(f) \cdot \frac{1}{X_R(f)} = \left[ \sqrt{S_N(f)} \cdot H(f) \right] \cdot \left[ \frac{1}{\frac{1}{\sqrt{S_N(f)}} \cdot H(f)} \right] \qquad (7)$$

which reduces to:

$$\left[\sqrt{S_N(f)} \cdot H(f)\right] \cdot \left[\frac{\sqrt{S_N(f)}}{H(f)}\right] = S_N(f) \qquad (8)$$

which is the N data block without distortion.

In addition to allowing the undistorted N data block 220 to be found, this invention also allows the channel frequency response to be determined, as will be explained later.

For two blocks of distorted data to produce one block of data without distortion, it is necessary that approximately the same complex frequency response, H(f), be applied to both data blocks. This is possible if a change in the echo is small in the time required to transmit both data blocks. If for example a wide bandwidth is used to reduce the block length to 100–1000 microseconds, this system will work at automobile speeds using short carrier wavelengths. It is desirable to transmit the N and R data blocks in adjacent time slots if dynamic multipath is expected in the signal path 120.

Upon initial inspection, this system provides only one block of data out for every two blocks of data transmitted. However, since the two blocks are correlated, and noise contaminating each of the 2 blocks is uncorrelated, there is a trade-off, but no penalty. Thus the transmit power may be reduced or more information may be transmitted in a block by increasing the number of symbols used.

One problem with this transmission system is that if the N data block has a very low amplitude at some frequency, the R data block will have a very large amplitude at that same frequency. One type of signal that can have controllable amplitudes at all frequencies is OFDM. Other signals also work For example, a set of N and R data blocks with all non-zero frequency terms could be stored in ROM (read only memory) and selectively retrieved for transmission.

Figure 2:
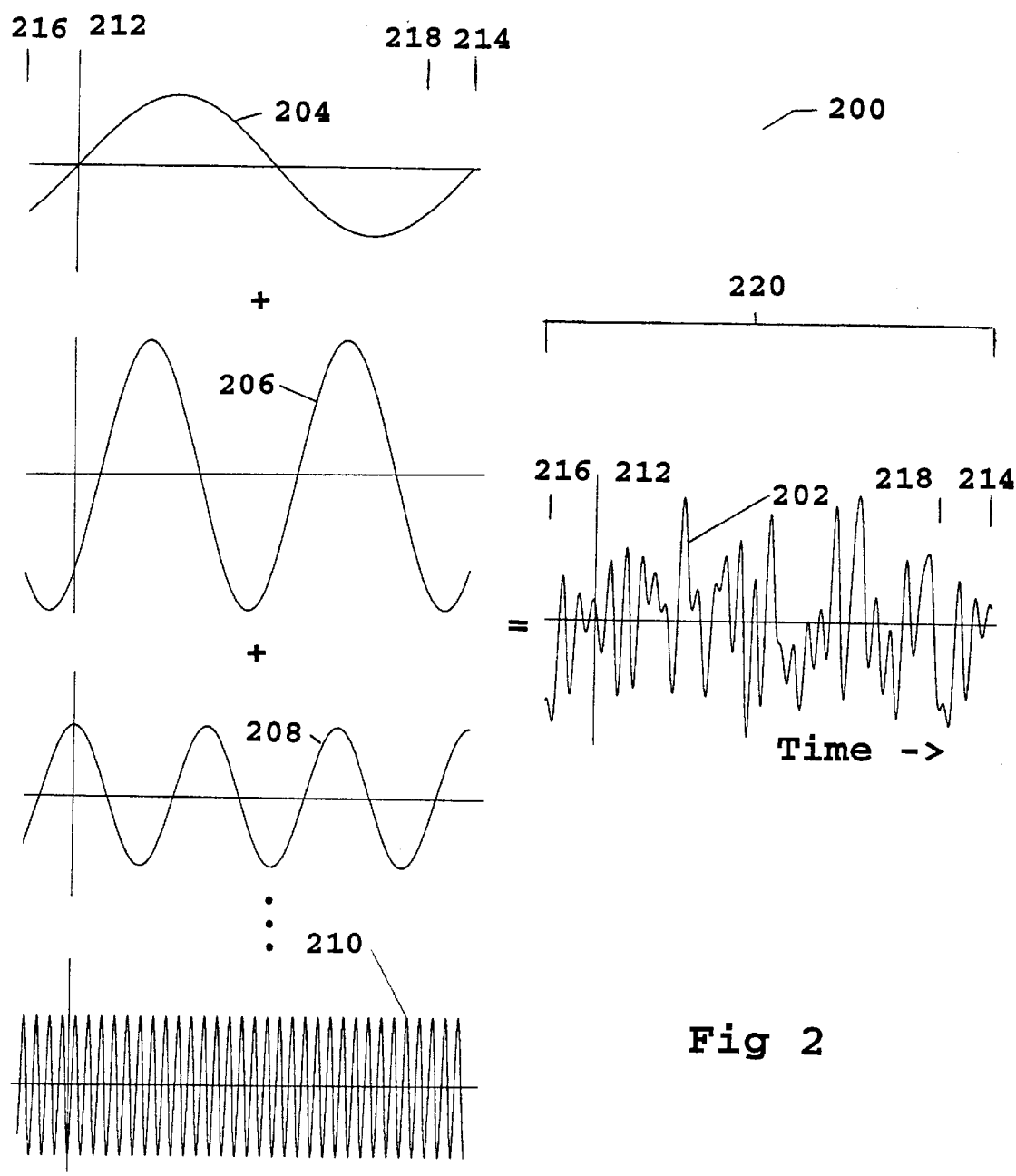
FIG. 2 is a normal (N) wave diagram illustrating a normal OFDM signal with a guard interval in the time domain

FIG. 2 is a normal (N) wave diagram 200 showing the construction of a composite N OFDM signal 202. OFDM signals are well known in the art. Frequently, multiple thousand harmonic sinusoids make up the composite signal, but for the sake of explanation, only 31 are used in FIG. 2. The composite N OFDM signal 202 is comprised of its component harmonic N waves including a first harmonic N wave 204, a second harmonic N wave 206, a third harmonic N wave 208, through a 31st harmonic N wave 210. Thirty-one harmonic waves make up the composite signal 202 but only the first three and the last wave are illustrated. All 31 of the component harmonic N waves summed together make the composite N OFDM signal 202. The frequency of each of the component harmonic N waves is an integer multiple of the first harmonic N wave 204. Each harmonic wave has a coefficient which is a complex number. The coefficient may be represented as a magnitude and a phase, or as a real part and an imaginary part.

If $s_N(t)$ is a N data block, it may be represented in the time domain as;

$$s_N(t) = A_1 \sin(\omega_1 t + \phi_1) + A_2 \sin(\omega_2 t + \phi_2) + A_3 \sin(\omega_3 t + \phi_3) + \ldots + A_J \sin(\omega_J t + \phi_J) \qquad (9)$$

where the individual harmonically related frequencies are $\omega_n$ (n is the coefficient number), t is time. The coefficient magnitudes are $A_n$ and the coefficient phases are $\phi_n$, where n may be from 1 to J, where J is the number of terms making up the data block. Thus a data block has many coefficients which are complex numbers with magnitudes and phases.

The phases and magnitudes of each of the J component harmonic N waves are varied as a method of sending information over an RF channel or signal path 120. The magnitudes and phases are typically assigned discrete values. The magnitude is the peak voltage of the signal, and the phase is the angle of the signal at a begin N time marker 212. The basic waveform runs from the begin N time marker 212 to a stop N time marker 214. A guard interval can be created by cutting samples from the last part of the composite N OFDM signal 202 between a cut N time marker 218 and the stop N time marker 214 and appending the samples to the front of the composite N OFDM signal 202. The samples are attached between a front N time marker 216 and begin N time marker 212. Thus, the composite N OFDM signal is a normal (N) data block 220.

The use of a guard interval improves the reception of the OFDM signals in the presence of multipath, provided the delay of the multipath is less than the length of the guard interval and the start of the signal sampling begins after the delay of the echo. In practice, composite OFDM signals are created by employing an IFFT to create the time domain composite N OFDM signal 202. Digital signal processing (DSP) integrated circuits such as the Texas Instruments TMS320C30 can be programmed to do IFFTs. IFFTs are also done by dedicated integrated circuits.

If the N data block 220 is received through a channel that is contaminated with multipath, and the delay of the multipath is less than the duration of the guard interval, the component harmonic waves will be disturbed both in amplitude and phase. As is known in the art, the effect of the distortion can be removed from an OFDM signal by using a single complex multiplication to correct the amplitude and the phase of each component harmonic wave. Each component harmonic wave must have its own complex coefficient for the multiplication. Typically determining the correct set of coefficients requires the use of training signals or pilot signals.

Sometimes, the multipath is so severe that one or more component harmonic N waves will be completely canceled or sufficiently reduced in amplitude that it is not discernible in the presence of noise. A forward error correcting code, such as a Reed Solomon code, is commonly applied to the data block so the complete loss of a few component harmonic N waves can be corrected by the code.

Figure 3:
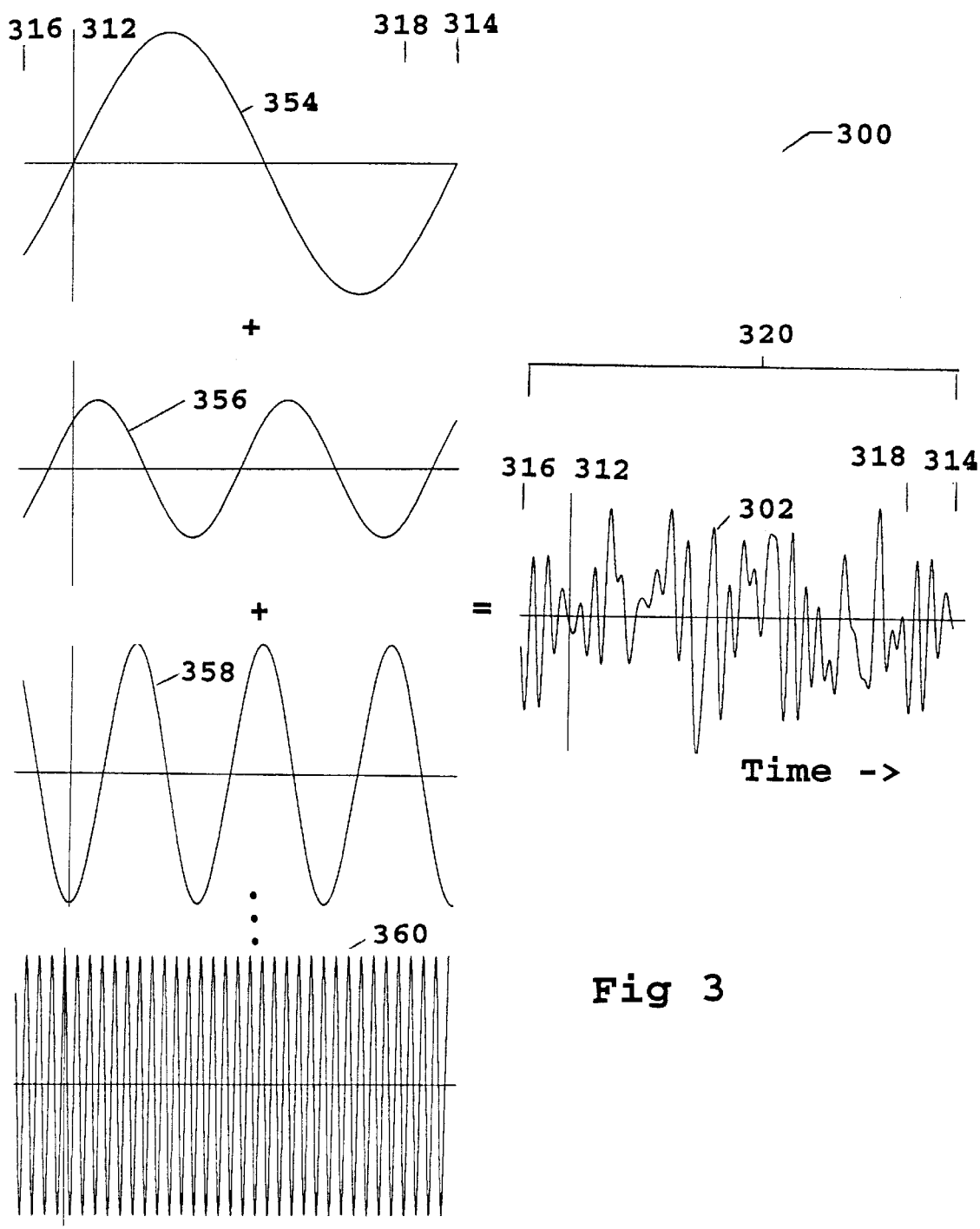
FIG. 3 is a reciprocal (R) wave diagram which is the inverse of the OFDM signal illustrated in FIG. 2.

FIG. 3 is a reciprocal (R) wave diagram 300 showing the construction of a composite R OFDM signal 302 from its component harmonic waves. Each component wave is the reciprocal in the frequency domain of the corresponding harmonic wave with the same frequency in FIG. 2. The reciprocal magnitude is found by dividing the magnitude into 1.0. The reciprocal angle is found by changing the sign of the angle. Thus if the second harmonic N wave 206 has an amplitude of 1.29 at −45 degrees, a corresponding second harmonic R wave 356 has an amplitude of 0.794 at +45 degrees. The composite R OFDM signal 302 is comprised of its component R harmonic waves including a first harmonic R wave 354, the second harmonic R wave 356, a third harmonic R wave 358, through a 31st harmonic R wave 360. FIG. 3 also illustrates a begin R time marker 312, a stop R time marker 314, a front R time marker 316, and a cut R time marker 318 which are equivalent to the time markers in FIG. 2. Thus, the composite R OFDM signal is a reciprocal (R) data block 320.

If $s_R(t)$ is a reciprocal OFDM signal, it may be represented in the time domain as:

$$S_R(t) = B_1 \sin(\omega_1 t + \delta_1) + B_2 \sin(\omega_2 t + \delta_2) + B_3 \sin(\omega_3 t + \delta_3) + \ldots + B_J \sin(\omega_J t + \delta_J) \qquad (9)$$

where the individual harmonically related frequencies are $\omega_n$ (n is the coefficient number) and t is time. The coefficient magnitudes are $B_n$ and the coefficient phases are $\delta_n$, where n may be from 1 to J. Thus a reciprocal data block has many coefficients which are complex numbers with both magnitudes and phases. A reciprocal coefficient is created from a normal coefficient by dividing the magnitude into 1:

$$B_n = 1/A_n \tag{10}$$

and by inverting the sign on the angle:

$$\delta_n = -\phi_n \tag{11}$$

The component harmonic R waves 354–360 are similarly affected by a multipath (or other linear distortion) signal path 120 as the component harmonic N waves 204–210. In particular, as a result of multipath, each component harmonic R wave will have its magnitude increased or decreased by the same fractional increase or decrease of the corresponding component harmonic N wave which is at the same frequency. Each component harmonic R wave will have its phase rotated by the same angle as the phase rotation on the corresponding component harmonic N wave which is at the same frequency.

Figure 4:
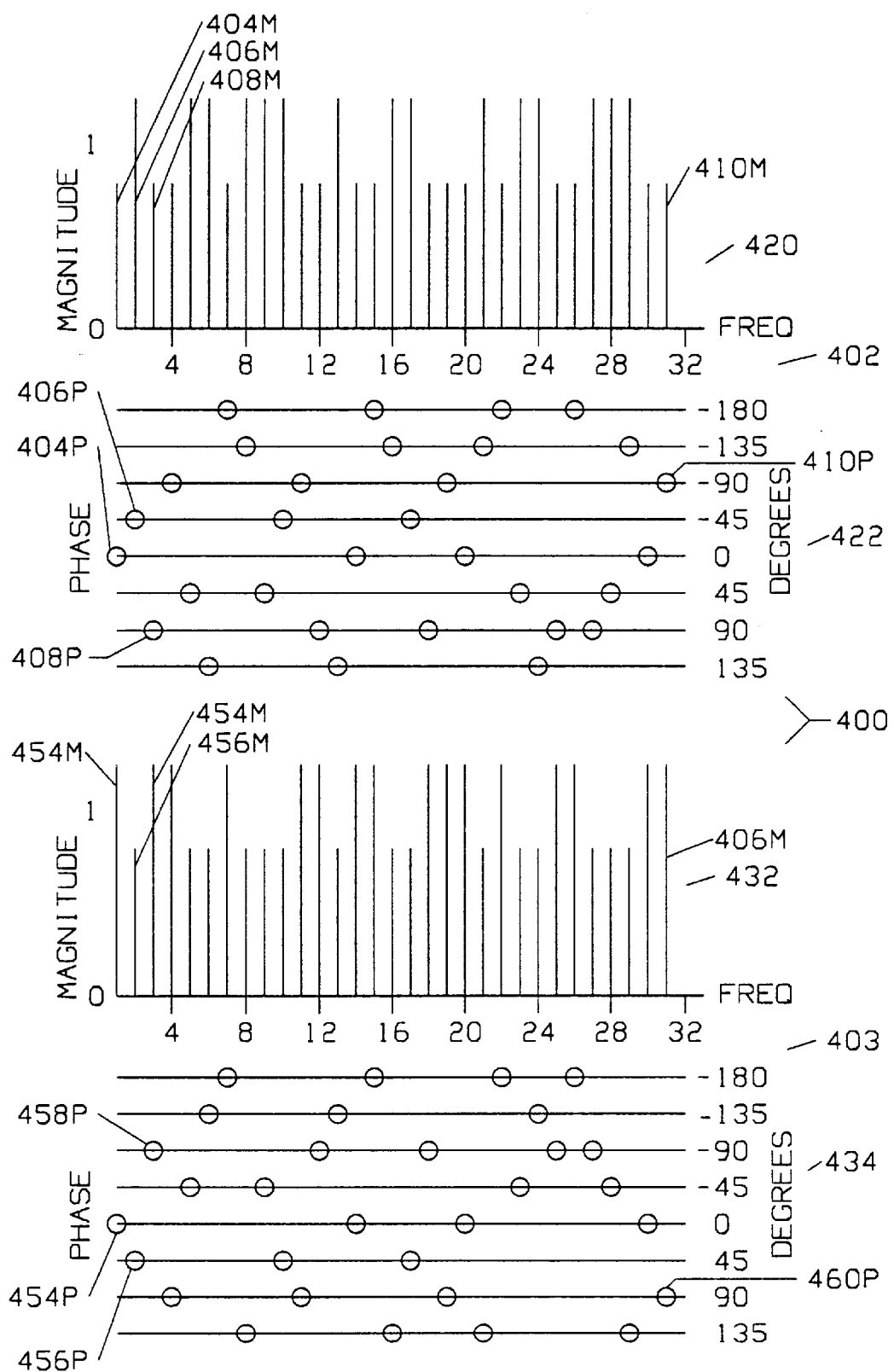
FIG. 4 is a pair of spectral traces illustrating a normal OFDM signal and a reciprocal OFDM signal.

FIG. 4 contains a pair of spectral traces 400 comprised of an N spectral diagram 402 with an N magnitude plot 420, and an N phase plot 422. The plots 420 and 422 can be obtained by receiving the N composite OFDM signal 202 and transforming it with a FFT. In the N magnitude plot 420, a first N coefficient magnitude 404M in the frequency domain is the result of the first harmonic N wave 204. The second harmonic N wave 206, the third harmonic N wave 208 and the 31st harmonic N wave 210 can be identified as the sources of a second N coefficient magnitude 406M, a third N coefficient magnitude 408M and a 31st N coefficient magnitude 410M respectively. Likewise the N phase angles associated with the N coefficient magnitudes 404M–410M can be identified as a first N coefficient phase 404P, a second N coefficient phase 406P, a third N coefficient phase 408P, and a 31st N coefficient phase 410P.

FIG. 4 also contains an R spectral diagram 403 with a R magnitude plot 432, and a R phase plot 434. The plots 432 and 434 can be obtained by receiving the composite R OFDM signal 302 and transforming it with a FFT. In R magnitude plot 432, the first R coefficient magnitude 454M in the frequency domain is the result of the first harmonic R wave 354. The second harmonic R wave 356, the third harmonic R wave 358 and the 31st harmonic R wave 360 can be identified as the sources of a second R coefficient magnitude 456M, a third R coefficient magnitude 458M and a 31st R coefficient magnitude 460M respectively. Likewise, the R phase angles associated with the R coefficient magnitudes 454M, 456M, 458M and 460M can be identified as a first R coefficient phase 454P, a second R coefficient phase 456P, a third R coefficient phase 458P, and a 31st R coefficient phase 460P respectively. If an N spectral coefficient has a larger magnitude, the R spectral coefficient with the same harmonic number will have a smaller (reciprocal) magnitude. Likewise, if the phase associated with an N spectral coefficient is positive, the phase associated with the corresponding R spectral coefficient will be negative, and vice-versa Description—FIG. 5

Figure 5:
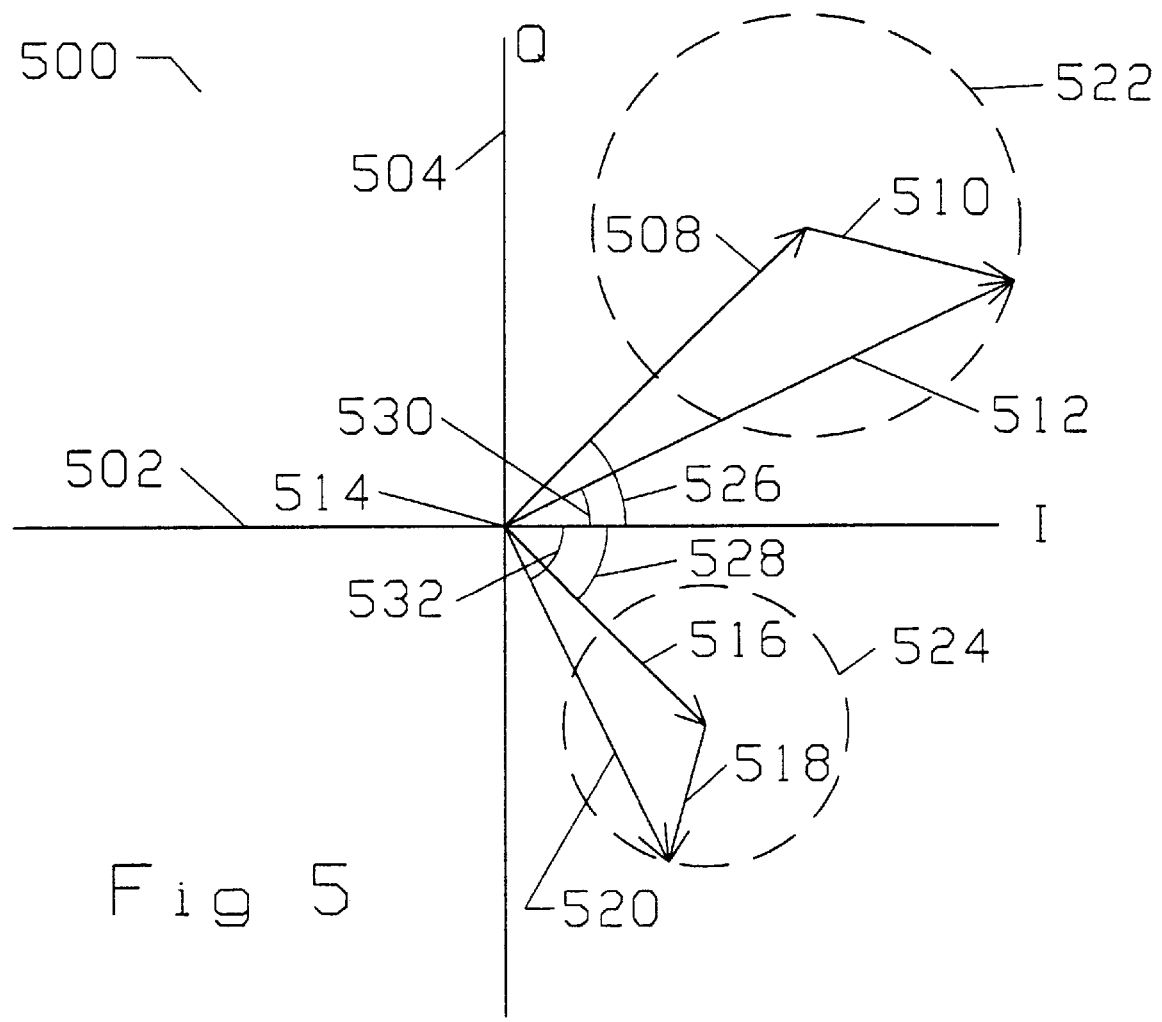
FIG. 5 is a vector diagram illustrating how a harmonic coefficient from a first block and a corresponding harmonic coefficient from a second block are processed to cancel multipath.

FIG. 5 is a vector diagram 500 showing the removal of multipath from a single component harmonic N wave coefficient 508. The vector diagram features an inphase axis 502 and a quadrature axis 504. The component harmonic N wave coefficient 508 in this example has been assumed to have a value of 1.39 at a +45 degree angle 526. Hence a component harmonic R wave coefficient 516 will have a value of 0.720 at a −45 degree angle 528. An echo affects both the component harmonic N wave coefficient 508 and the component harmonic R wave coefficient 516. If the echo has a magnitude of 0.5 and a −60 degree angle, an N error vector 510 will be added to the component harmonic N wave coefficient 508 giving an N vector sum 512 which is 1.84 at a 25.9 degree angle 530. Likewise an R error vector 518 will be added to the component harmonic R wave coefficient 516 giving an R vector sum 520 which is 0.953 at a −64.1 degree angle 532. If the N vector sum 512 is divided by the R vector sum 520, the result is 1.932 at an angle of 90 degrees. If the square root is taken on this quotient, the result is 1.39 at 45 degrees, which is the originally transmitted component harmonic N wave coefficient 508.

In general, a single added echo will produce a vector sum with a circular locus as the harmonic number (frequency) is varied. Hence, the N vector sum 512 at other frequencies will land on N circular locus 522 and the R vector sum 520 will land on R circular locus 524.

Description—FIGS. 6–9

Figure 6:
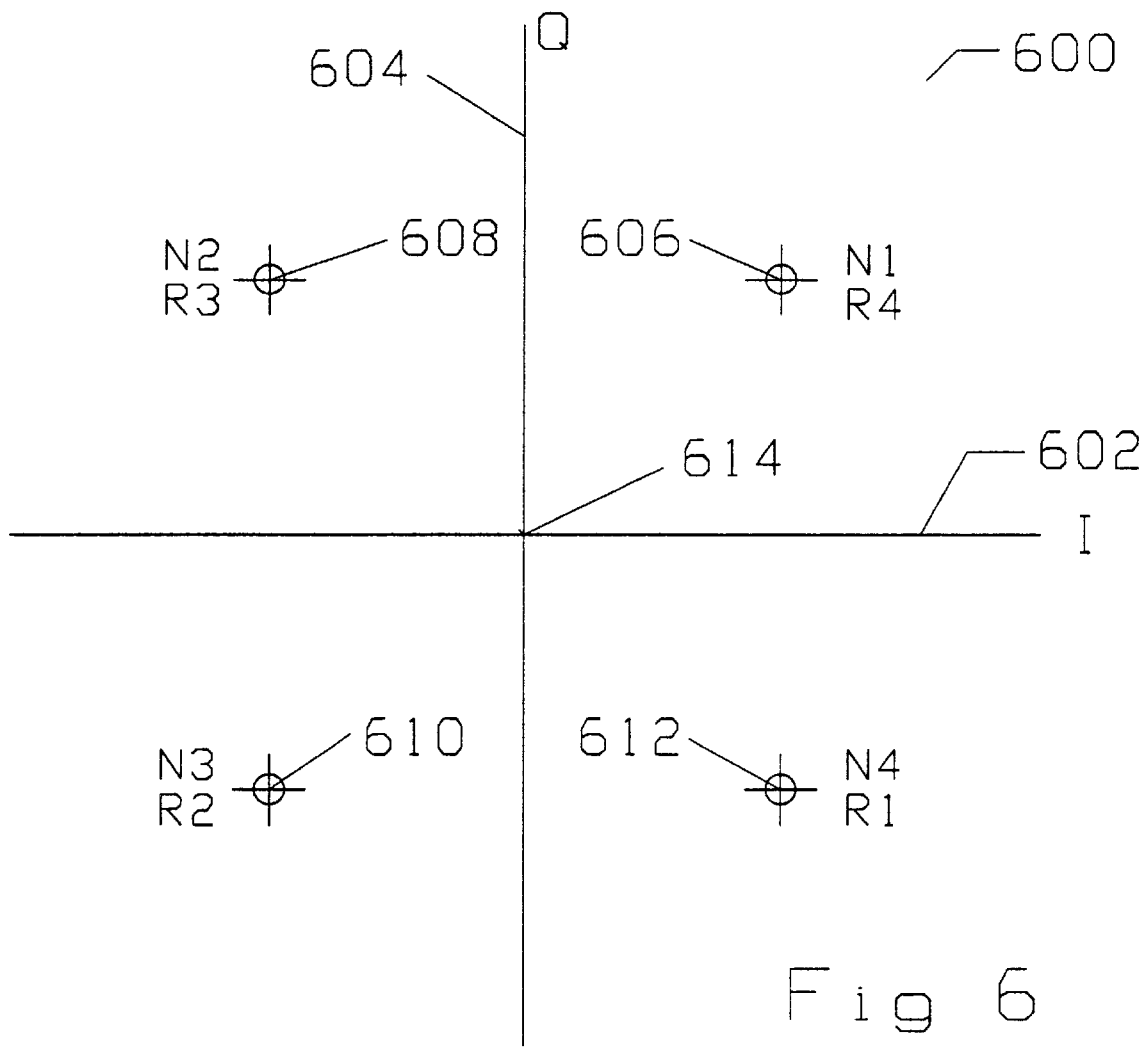
FIG. 6 is a four point constellation diagram showing normal and reciprocal points.

According to the present invention, many constellation diagrams are possible. It is useful to examine what an R constellation diagram will look like given the N constellation. FIG. 6 is a 4-point constellation diagram 600. Constellation diagrams on OFDM signals plot the magnitude and phase of individual harmonics on a graph with an inphase axis 602, a quadrature axis 604, and an origin 614. Four phases at constant magnitude are identified as a first point 606, a second point 608, a third point 610, and a fourth point 612. The N constellation points are marked with an cross and the R constellation points are marked with a circle. As can be seen, crosses and circles fall on top of each other in this example because the magnitude of each coefficient is constant. If the N harmonic magnitude and phase places it at the first point 606 (N1), the matching R harmonic magnitude and phase will place it at the fourth point 612 (R1). If the N harmonic magnitude and phase places it at 608 (N2), the matching R point will be at 610 (R2). If the N point is at 612 (N4), the matching R point will be at 606 (R4). Finally if the N point is at 610 (N3), the matching R point will be 608 (R3).

Figure 7:
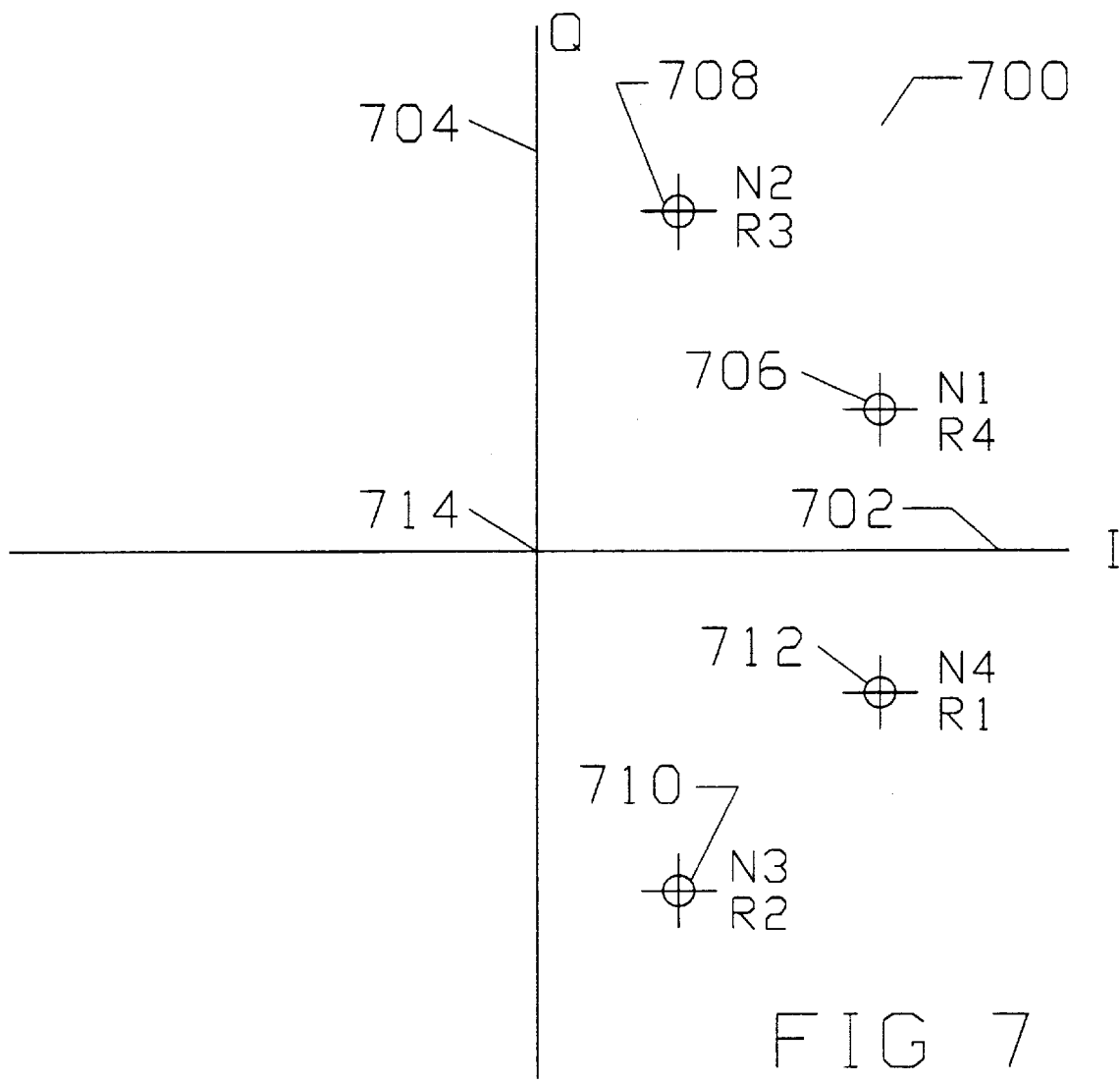
FIG. 7 is a square root constellation diagram showing square root normal and reciprocal points.

FIG. 7 illustrates a square root constellation diagram 700. A square root signal with a 4-point constellation diagram is transmitted FIG. 7 features an inphase axis 702, a quadrature axis 704, and an origin 714. A constellation point 706, a constellation point 708, a constellation point 710, and a constellation point 712 have each been rotated by half of the distance towards the positive inphase axis 702. Multiplication of complex numbers involves multiplication of the magnitude term and addition of the angles. Therefore, this constellation, when processed in the receiver 106 by inverting the R coefficients and multiplying the R coefficients by the N coefficients, will result in a square constellation. If this square root constellation is transmitted over a signal path 120, it solves another problem with OFDM: if the signal capture of the received block is not started exactly at the begin N time marker 212 or begin R time marker 312, a rotation of the received constellation coefficients will occur. The higher frequency harmonics suffer more rotation. The use of the square root constellation of FIG. 7 automatically corrects for an incorrect start time for sampling. However, the sampling start error must still be less than the guard interval minus the longest echo. The sampling of the N data block 220 and the R data block 320 should be done with a continuous sampling clock so that any sampling error is identical in both blocks.

More constellation points allow more information to travel in a fixed bandwidth channel at the expense of a lowered immunity to random noise. In general, constellations should have the maximum distance between points while minimizing total power transmitted The power associated with a constellation point is proportional to the distance of the constellation point from the origin squared. Maximum distance provides for good performance in the presence of noise. Conventional 16 point square constellations are not optimal for the present applications because the 4 points that are located closest to the origin in the N constellation end up with large amplitudes in the R constellation. Constellations with points located on a circle centered at the origin, such as 8-PSK (phase shift keyed) are good.

Figure 8:
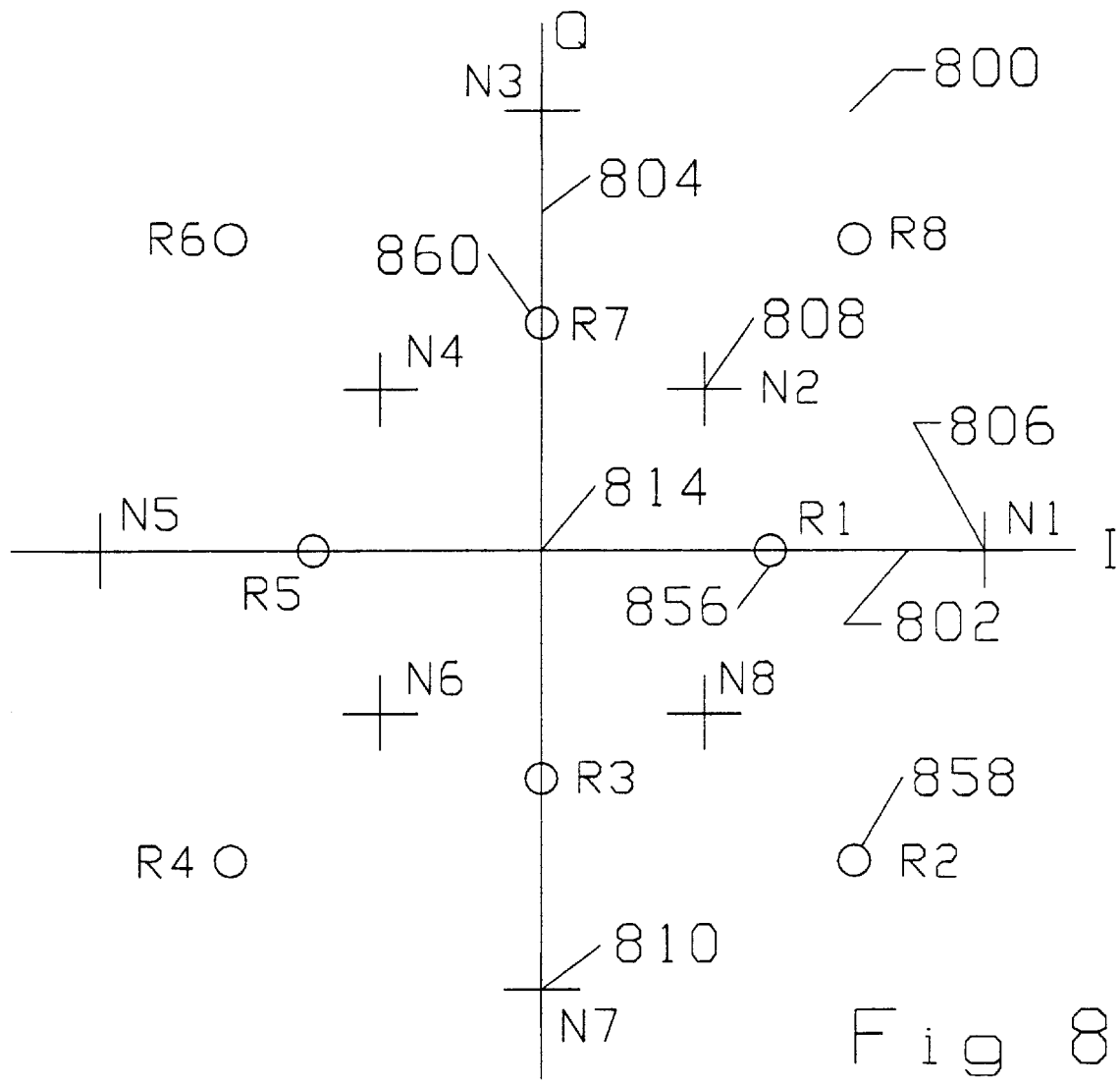
FIG. 8 is an 8 point constellation diagram showing 8 normal and 8 reciprocal points.

FIG. 8 is an 8 point constellation diagram 800. It features an inphase axis 802, a quadrature axis 804, and an origin 814. It employs 8 N points designated as crosses and 8 R points designated as circles. In this figure, the crosses and circles are not superimposed because N carrier magnitude is not fixed: it may take 2 levels. As examples, first N point 806 (N1) is matched by first R point 856 (R1). Second N point 808 (N2) is matched by second R point 858 (R2) and 7th N point 810 (N7) is matched by 7th R point 860 (R7).

Figure 9:
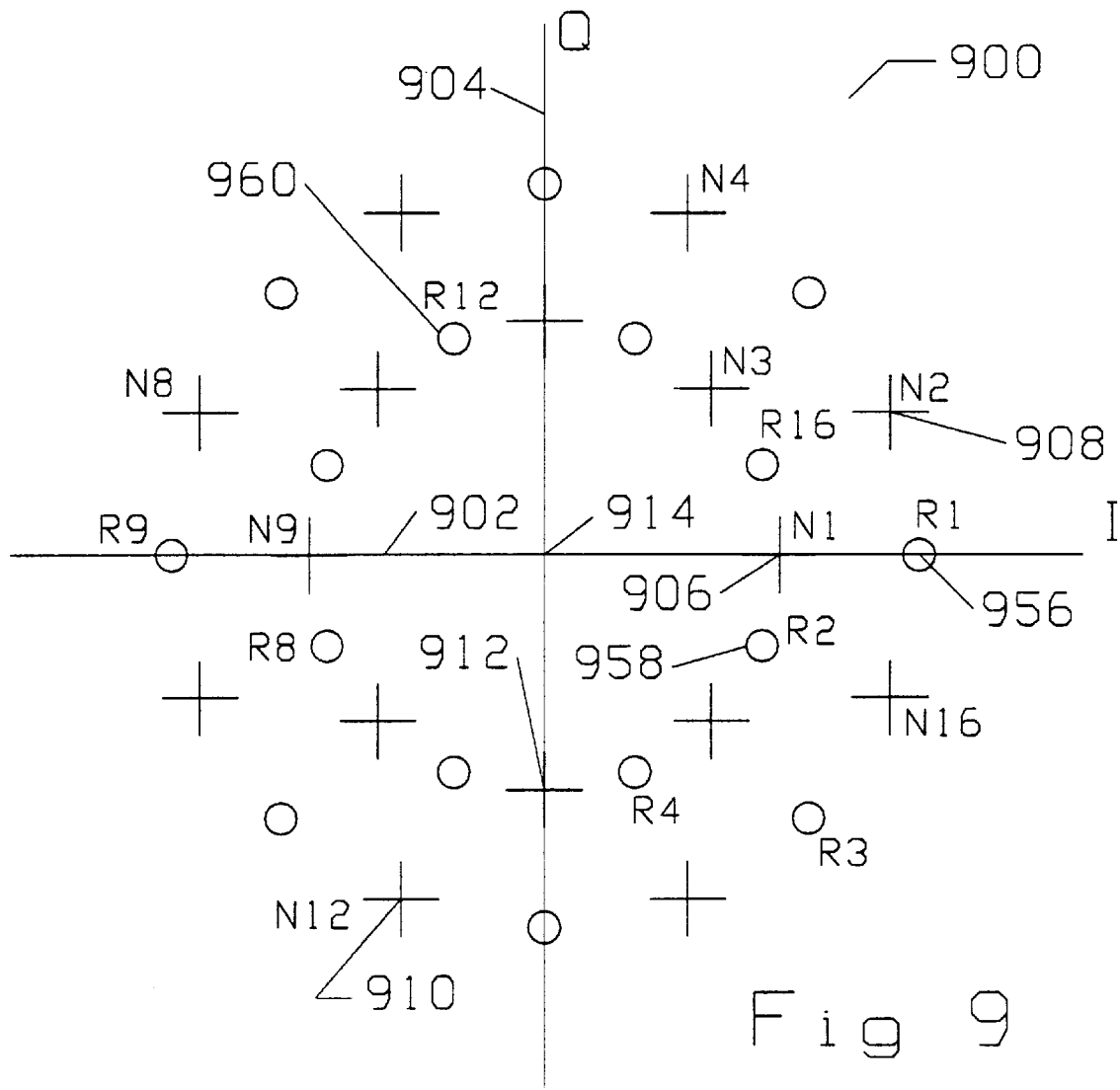
FIG. 9 is a 16 point constellation diagram showing 16 normal and 16 reciprocal points.

FIG. 9 is a 16 point constellation diagram 900. It features an inphase axis 902, a quadrature axis 904, and an origin 914. It employs 16 N points designated as crosses and 16 R points designated as circles. In this figure, the crosses and circles are not superimposed because N carrier magnitude is not fixed: it may take 2 levels. As examples, first N point 906 (N1) is matched by first R point 956 (R1). Second N point 908 (N2) is matched by second R point 958 (R2) and 12th N point 910 (N12) is matched by 12th R point 960 (R12).

Description—How to Find Frequency Response

The frequency response of the channel or signal path 120 may be determined by the system of the present invention by multiplying the received N data block times the R data block without first inverting the received reciprocal $X_R(f)$:

$$X_N(f) \cdot X_R(f) = [S_N(f) \cdot H(f)] \cdot \left[\frac{1}{S_N(f)} \cdot H(f)\right] = H^2(f) \quad (12)$$

Thus the complex frequency response of the channel is found from:

$$H(f) = \sqrt{H^2(f)} \quad (13)$$

If the frequency response is transformed into the time domain with the IFFT, the channel's impulse response can be found.

This is a fundamentally different approach from the conventional channel characterization method because the blocks are transporting random data and because no stored reference signal is used. Because a stored reference signal is not used, the frequency response and phase values from equation (13) will be relative between blocks by this method.

This method makes it appear wasteful to use a fixed reference training signal to characterize an analog television channel. The training signal used in the United States on line 19 in the vertical blanking interval is sent as a two-block fixed signal. Thus this signal could be replaced with a signal according to the present invention to transport digital information in the reference training signal. Ideally the blocks would occupy adjacent vertical interval lines in the same field so the echo would not change significantly between blocks. As an additional benefit, the data transported by/as the training signal would be highly resistant to rapidly changing severe multipath

Figure 10:
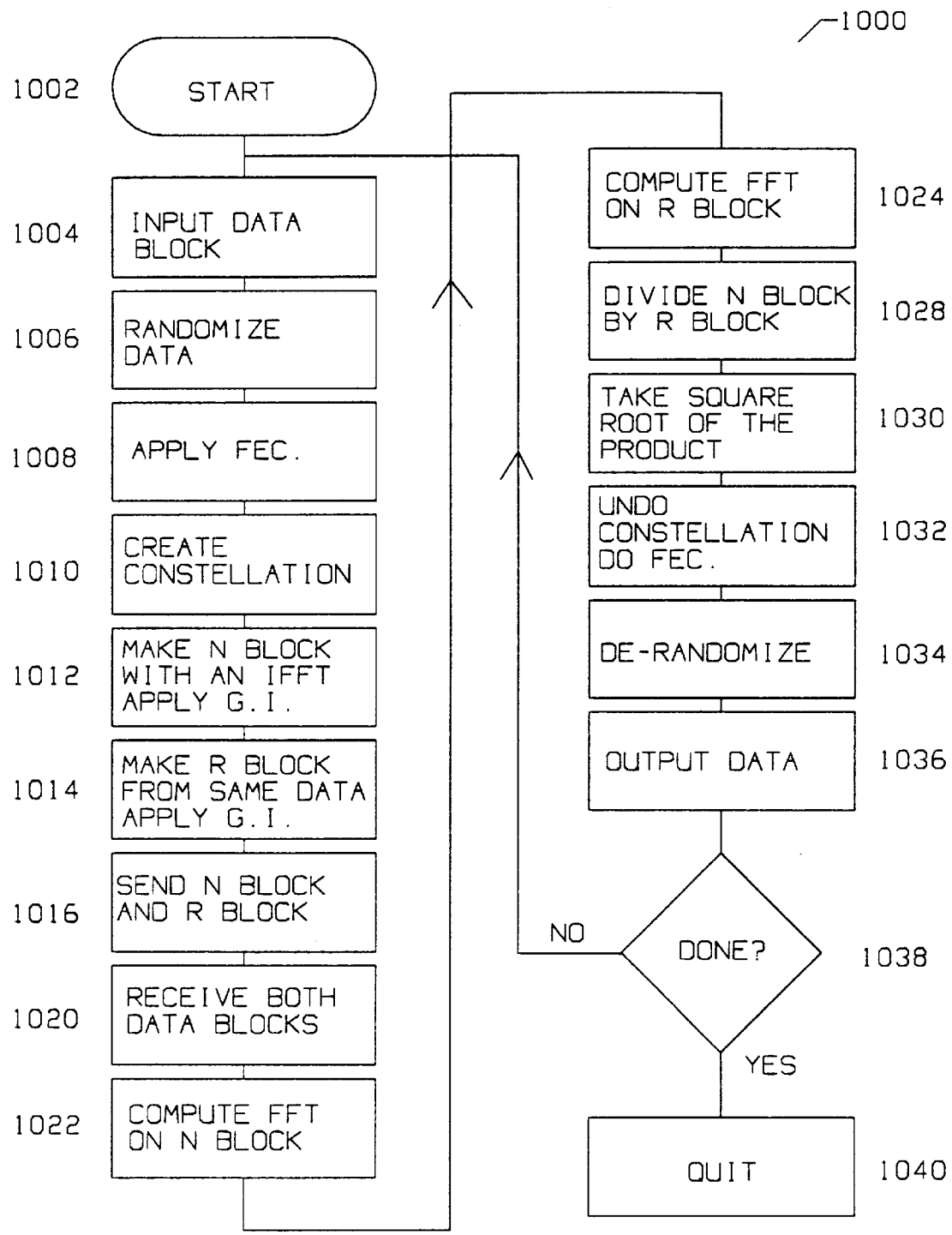
FIG. 10 is a flow diagram for the transmission system.

Description—FIGS. 10-11

FIG. 10 is a flow diagram 1000 of the transmission system. A beginning 1002 is the start point. At a first step 1004 a data block is input from a data source, which could be a file for example. At a second step 1006 the data block is randomized to remove any long strings of 1's or 0's. At a third step 1008 a FEC code such as a Reed-Solomon code is applied At a fourth step 1010 the data bits are made into a constellation (symbols). If the constellation has more points, more bits of data can be carried in a data block. At a fifth step 1012 the constellation points are transformed into an N data block in the time domain via the IFFT. A guard interval (G.I.) is also applied to the N data block in the fifth step 1012. At a sixth step 1014 a R data block is created by taking the reciprocal of the frequency coefficients of the N block and again using an IFFT. A guard interval is also applied to the R data block in the sixth step.

At a seventh step 1016 both the N and the R data blocks are transmitted. The transmission order is not important, but the delay between blocks should be kept to a minimum so the multipath will not change. Ideally the N data block 220 and R data block 320 should be in adjacent time slots. At an eighth step 1020 both N and R data blocks are received. At a ninth step 1022 the FFT is performed on the N data block. The FFT normally has a size of 2 to some integer power. At a 10th step 1024 the FFT is performed on the R data block. At an 11th step 1028 the R data block is divided into the N data block using complex arithmetic. At a 12th step 1030 the square root is taken on the product of the 11th step 1028, provided that the square root function was not performed at the transmit site on the N and R data blocks. At a 13th step 1032 the data is taken out of the constellation (symbols) and converted to bits, and forward error correction is done. At a 14th step 1034 the data is de-randomized. At a 15th step 1036 the data is outputted. The output may go into file or other use. If more data is coming, a 16th step 1038 continues processing at the first step 1004. If not, the flow terminates at a 17th step. 1040.

FIG. 11 is a program listing 1100 in the C programming language which creates 2048 bits of random data. From the 2048 bits, 1024 constellation points (4 point diagram) are created making an N data block 220. An R data block 320 is created from the same random data. A phase rotation is used to generate the reciprocal coefficients. The listing also processes the received N data block and R data block and creates a de-ghosted N data block. The code to perform the IFFT and FFT functions is contained in *C Language Algorithms for Digital Signal Processing* by P Embree and B Kimball (published by Prentice Hall). The modulation, demodulation and ghost-adding steps are not done. Likewise, no FEC or randomizing has been applied.

SUMMARY OF THE INVENTION

This novel transmission system provides a solution for the problem of bandwidth-efficient data transmission over signal paths with dynamic multipath. As a second feature, the new system can be used to characterize the frequency response of the channel using random data.

This invention increases the value of the short wavelength frequency spectrum by enabling applications that do not currently work, or are not practical, because of dynamic multipath and other linear distortions.

Although the description above contains many specificities, these should not be construed a limiting the scope of the invention but as merely providing illustrations of some of the presently preferred embodiments of this invention. For example:

1. The data blocks can be processed or manipulated by a dedicated circuit, a programmable digital signal processing integrated circuit, a personal computer, or a generic microprocessor.
2. The N data blocks and the R data blocks can be carried as baseband signals or modulated onto an RF carrier. As baseband signals, the system can be used over telephone lines. Modulation may be single sideband, such as VSB, or double sideband, such as QAM.
3. A number of different error correcting codes can be used to correct errored symbols thereby improving the error rate performance in the presence of random noise or severe echoes.
4. This system could be used in conjunction with other transmission systems. For example, the system of the present invention can be used with a conventional OFDM system whereby the N and R blocks are sent intermittently to characterize the channel. The conventional OFDM system could then utilize the frequency coefficients determined from the N and R blocks for an amplitude and phase correction of its own multipath distorted frequency coefficients. Likewise the system according to the present invention may be carried in the vertical interval on an analog television transmission.
5. A wide variety of applications are envisioned for this system because of its ability to receive deghosted data in the presence of dynamic (rapidly changing) multipath, and because the integrated circuits required to do the computations continue to drop in price, size, and power, while processing speed continues to increase. Applications envisioned include personal communications services, cellular telephone, wireless broadband television delivery, digital audio, data delivery, and cordless phones. The system can also be used to provide wireless connections to local area networks (LANs) or to the internet. The system can also find applications for wireless intercoms and wireless printer drivers.
6. The system of the present invention can be used for single frequency networks. Single frequency networks use multiple transmit locations with each transmitter radiating the identical frequency-coherent signal with the same block timing. The purpose of a single frequency network is to improve coverage for receivers.
7. Currently, multiple OFDM transmitters use the same upstream cable frequency band in the same time slots. This is possible because they use different frequency domains coefficients, but the same block time markers and stop time markers. Each transmitter uses a coefficient of zero for all frequencies that other transmitters are using. The system of the present invention will also work with this system.
8. The present system has an advantage for cable upstream systems, although the upstream cable echoes do not typically change rapidly. Each transmitter in a house has a different frequency response on the signal path back to the headend due to the tree and branch architecture used by cable. The present invention would eliminate the need for the transmission to be pre-distorted, or for the adaptive equalizer coefficients to be stored at the receive site, or for a reference signal to be transmitted. Frequently, cable return transmissions of computer data are done in a block mode.
9. Should either the N data block or the R data block be completely contaminated by impulsive noise, the receiver can attempt to output good data by using the uncontaminated data block. Optionally the receiver can deghost the uncontaminated data block with a stored set of coefficient corrections made from earlier uncontaminated blocks of data.
10. A receiver according to the present invention may need an automatic gain control (AGC) function. However, because of division of the N data block 220 by the R data block 320, the AC does not need to be particularly fast or accurate, since any gain error will be divided out.
11. Many techniques have been developed to adapt OFDM signals to special situations, such as allowing multiple access control, unique channel impairments, etc. These techniques will frequently work in conjunction with the present invention.
12. Other linear channel impairments can be corrected by the present invention, including frequency tilt, excessive group delay, and sharp dips in the channel frequency response.
13. There is a duality between time and frequency. It is well known in the art that a multiplication in the frequency domain is equivalent to a convolution in the time domain. Thus it is anticipated that the present invention can be implemented using time domain digital signal processing techniques. For example, by transmitting a square root N data block and a square root R data block the necessary multiplication in equation (12) in the frequency domain can be handled in the time domain by a convolution using the two N and R time domain data blocks, yielding the impulse response of the channel.
14. Additional constellations are anticipated List of Item Numbers FIG. 1
100 signal path block diagram
102 transmitter
104 transmitting antenna
106 receiver
108 receiving antenna
110 RF signal
112 direct signal path
114 reflecting object
116 echo signal
118 echo signal path
120 signal path
122 received signal
124 direct path signal
FIG. 2
200 normal wave diagram
202 composite normal (N) OFDM signal 204 first harmonic N wave
206 second harmonic N wave
208 third harmonic N wave
210 31st harmonic N wave
212 begin N time marker
214 stop N time marker
216 front N time marker
218 cut N time marker
220 N data block
FIG. 3
300 reciprocal wave diagram
302 composite reciprocal (R) OFDM signal
312 begin R time marker
314 stop R time marker
316 front R time marker
318 cut time R marker
320 R data block
354 first harmonic R wave
356 second harmonic R wave
358 third harmonic R wave
360 31st harmonic R wave
FIG. 4
400 a pair of spectral traces
402 N spectral diagram
403 R spectral diagram
404M first N coefficient magnitude
404P first N coefficient phase
406M second N coefficient magnitude
406P second N coefficient phase
408M third N coefficient magnitude
408P third N coefficient phase
410M 31st N coefficient magnitude
410P 31st N coefficient phase
420 N magnitude plot
422 N phase plot
432 R magnitude plot
434 R phase plot
454M first R coefficient magnitude
454P first R coefficient phase
456M second R coefficient magnitude
456P second R coefficient phase
458M third R coefficient magnitude
458P third R coefficient phase
460M 31st R coefficient magnitude
460P 31st R coefficient phase
FIG. 5
500 vector diagram
502 inphase axis
504 quadrature axis
508 component harmonic N wave coefficient
510 N error vector
512 N vector sum
514 origin
516 component harmonic R wave coefficient
518 R error vector
520 R vector sum
522 N circular locus 524 R circular locus
526 45 degree angle
528 −45 degree angle
530 25.9 degree angle
532 −64.1 degree angle
FIG. 6
600 4 point constellation diagram
602 inphase axis
604 quadrature axis
606 first point
608 second point
610 third point
612 fourth point
614 origin
FIG. 7
700 square root constellation diagram
702 inphase axis
704 quadrature axis
706 constellation point
708 constellation point
710 constellation point
712 constellation point
714 origin
FIG. 8
800 8 point constellation diagram
802 inphase axis
804 quadrature axis
806 first N point
808 second N point
810 7th N point
814 origin
856 first R point
858 second R point
860 7th R point
FIG. 9
900 16 point constellation diagram
902 inphase axis
904 quadrature axis
906 first N point
908 second N point
910 12th N point
914 origin
956 first R point
958 second R point
960 12th R point
FIG. 10
1000 Flow diagram
1002 beginning
1004 first step
1006 second step
1008 third step
1010 fourth step
1012 fifth step
1014 sixth step
1016 seventh step
1020 eighth step
1022 ninth step 1024 10th step
1028 11th step
1030 12th step
1032 13th step
1034 14th step
1036 15th step
1038 16th step
1040 17th step
FIG. 11
1000 C program listing Variables Used in Equations $s_N(t)$ N data block in time domain
$s_R(t)$ R data block in time domain
$S_N(f)$ N data block (freq. domain)
$S_R(t)$ R data block (freq. domain)
$H(f)$ complex freq. response
$X_N(f)$ received N data block
$X_R(f)$ received R data block
$A_n$ N block coefficient magnitude
$B_n$ R block coefficient magnitude
$\phi_n$ N block coefficient phase
$\delta n$ R block coefficient phase
n coefficient number
J number of coefficients in block
$\sqrt{S_N(f)}$ square root N data block
$1/\sqrt{S_N(f)}$ square root R data block

What I claim is:

1. A system for receiving signals without linear distortion comprising:
   a. a transmitter transmitting at least a normal data block and a reciprocal data block;
   b. a receiver receiving at least said normal data block, said reciprocal data block and linear distortion, and
   c. a processing element dividing frequency coefficients in the received reciprocal data block into frequency coefficients of the same frequency in the received normal data block and taking the square root on each quotient, whereby the linear distortion is removed from the normal data block.

2. A system for receiving signals without linear distortion according to claim 1, wherein each frequency coefficient in the reciprocal data block is the reciprocal of the corresponding frequency coefficient in the normal data block.

3. A system for receiving signals without linear distortion according to claim 1, wherein the data used to make the normal data block is the same data used to make the reciprocal data block.

4. A system for receiving signals without linear distortion according to claim 1, further comprising a guard interval included in the normal data block and a guard interval included in the reciprocal data block.

5. A system for receiving signals without linear distortion according to claim 1, further comprising a forward error correcting code applied to both the normal data block and the reciprocal data block.

6. A system for receiving signals without linear distortion according to claim 1, utilizing no low amplitude coefficients in the normal data block.

7. A system for receiving signals without linear distortion according to claim 1, further comprising one or more constellations used by said normal and reciprocal data blocks.

8. A system for receiving signals without linear distortion comprising:
   a. a transmitter transmitting at least a square root normal data block and a square root reciprocal data block;
   b. a receiver receiving at least said square root normal data block, said square root reciprocal data block and linear distortion, and
   c. a processing element dividing frequency coefficients in the square root reciprocal data block into the frequency coefficients in the square root normal data block, whereby linear distortion is canceled.

9. A system for receiving signals without linear distortion according to claim 8 further comprising the steps of sending the reciprocal data block immediately after the normal data block.

10. A system for receiving signals without linear distortion according to claim 8, further comprising the step of sending the normal data block immediately after the reciprocal data block.

11. A system for receiving signals without linear distortion according to claim 8, further comprising one or more constellations used by said normal and reciprocal data blocks.

12. A system for determining the frequency response of a signal path comprising:
    a. a transmitter transmitting at least a normal data block and a reciprocal data block;
    b. a receiver receiving at least said normal data block, said reciprocal data block and linear distortion, and
    c. a processing element multiplying frequency coefficients in the reciprocal data block by frequency coefficients in the normal data block, the square root taken on the product, whereby the frequency response of the signal path is determined.

13. A system for reducing distortion in a received multipath signal comprising:
    a. a transmitter transmitting a first normal data block and a second reciprocal data block;
    b. at least a primary and one or more secondary signal paths, said one or more secondary signal paths introducing multipath distortion;
    c. a receiver receiving at least said first and second data blocks over said primary signal path and said multipath distortion over said one or more secondary signal paths;
    d. a processing element inverting said received second data block;
    e. a processing element multiplying said inverted second data block and said received first data block, and
    said processing element taking the square root of the product of said multiplying function producing the normal data block without said multipath distortion.

14. A system for reducing distortion in a received multipath signal as per claim 13, wherein the square root of each of said first and second data blocks is transmitted instead of the signals themselves and said square root function after multiplication is eliminated.

15. A method for reducing distortion in a received multipath signal comprising:
    a. transmitting at least a first normal data block and a second reciprocal of said normal data block;
    b. receiving at least said first and second data blocks over a primary signal path and one or more secondary signal paths, said one or more secondary signal paths introducing multipath distortion;
    c. inverting said received second data block;

d. multiplying said inverted second data block and said received first data block, and e. taking the square root on the product of said multiplying function producing the normal data block without said multipath distortion.

16. A method for reducing distortion in a received multipath signal as per claim 15, wherein the square root of each of said first and second data blocks is transmitted instead of the original form and said square root function after multiplication is eliminated.

17. A method for processing a communication signal including linear distortion comprising:

a. transmitting at least a first data block over 4 primary signal path;

b. transmitting over said primary signal path at least a second data block comprising the reciprocal of said first data block;

c. receiving at least said first and second data blocks over said primary signal path and associated linear distortion;

d. in a first mode, processing said first and second data blocks to determine the frequency response of said primary signal path, and e. in a second mode, processing said first and second data blocks to determine the first data block without said associated linear distortion.

18. A system for receiving signals without linear distortion as per claim 17, wherein said linear distortion approaches zero.

19. A method for processing a communication signal including linear distortion as per claim 17, wherein said linear distortion approaches zero.

* * * * *